(12) United States Patent
Chang

(10) Patent No.: US 9,702,771 B2
(45) Date of Patent: Jul. 11, 2017

(54) SENSOR CAPABLE OF SENSING SHEAR FORCE

(71) Applicant: HON HAI PRECISION INDUSTRY CO., LTD., New Taipei (TW)

(72) Inventor: Jen-Tsorng Chang, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 141 days.

(21) Appl. No.: 14/788,292

(22) Filed: Jun. 30, 2015

(65) Prior Publication Data

US 2016/0349124 A1  Dec. 1, 2016

(30) Foreign Application Priority Data

May 26, 2015  (CN) .......................... 2015 1 0273333

(51) Int. Cl.
*G01L 1/16* (2006.01)
*G01L 1/00* (2006.01)
*G06F 3/16* (2006.01)
*G01L 1/04* (2006.01)
*G06F 3/01* (2006.01)

(52) U.S. Cl.
CPC .................. *G01L 1/16* (2013.01); *G01L 1/04* (2013.01); *G06F 3/016* (2013.01)

(58) Field of Classification Search
None
See application file for complete search history.

(56) References Cited

U.S. PATENT DOCUMENTS

| 5,033,309 A * | 7/1991 | Wycherley ............. G01N 19/04 73/774 |
| 7,497,133 B2 * | 3/2009 | Shih ..................... A61B 5/0053 73/862.639 |
| 8,826,748 B2 * | 9/2014 | Nakamura .............. G01L 5/228 73/774 |
| 2016/0313793 A1 * | 10/2016 | Hong ..................... G06F 3/016 |

* cited by examiner

*Primary Examiner* — Peter Macchiarolo
*Assistant Examiner* — Jermaine Jenkins
(74) *Attorney, Agent, or Firm* — Steven Reiss

(57) ABSTRACT

A sensor able to detect shearing forces as well as simple pressure includes a substrate, a support secured to the substrate, and shear force sensing unit located at an exterior surface of the support facing away from the substrate. The support can be elastically deformed in proportion to the shearing force or pressure. The shear force sensing unit includes first piezoelectric films on outer opposing shoulders of each support, the first piezoelectric film being elastically deformed with the support and outputting a signal accordingly. The magnitude of simple pressure is recorded by similar deformation of a second piezoelectric film entirely covering its support.

19 Claims, 7 Drawing Sheets

SENSOR CAPABLE OF SENSING SHEAR FORCE

FIELD

The subject matter herein generally relates to sensors, and particularly, to a sensor capable of sensing a shear force.

BACKGROUND

A piezoelectric sensor is configured to elastically deform and thereby generate a voltage when pressure is applied to the piezoelectric sensor. Additionally, the piezoelectric sensor can also elastically deform when a voltage is applied to the piezoelectric sensor. The piezoelectric sensor can have one or more piezoelectric film located therein. The piezoelectric film can itself respond such that when it is elastically deformed it generates a voltage.

BRIEF DESCRIPTION OF THE DRAWINGS

Implementations of the present technology will now be described, by way of example only, with reference to the attached figures.

DETAILED DESCRIPTION

Figure 1:
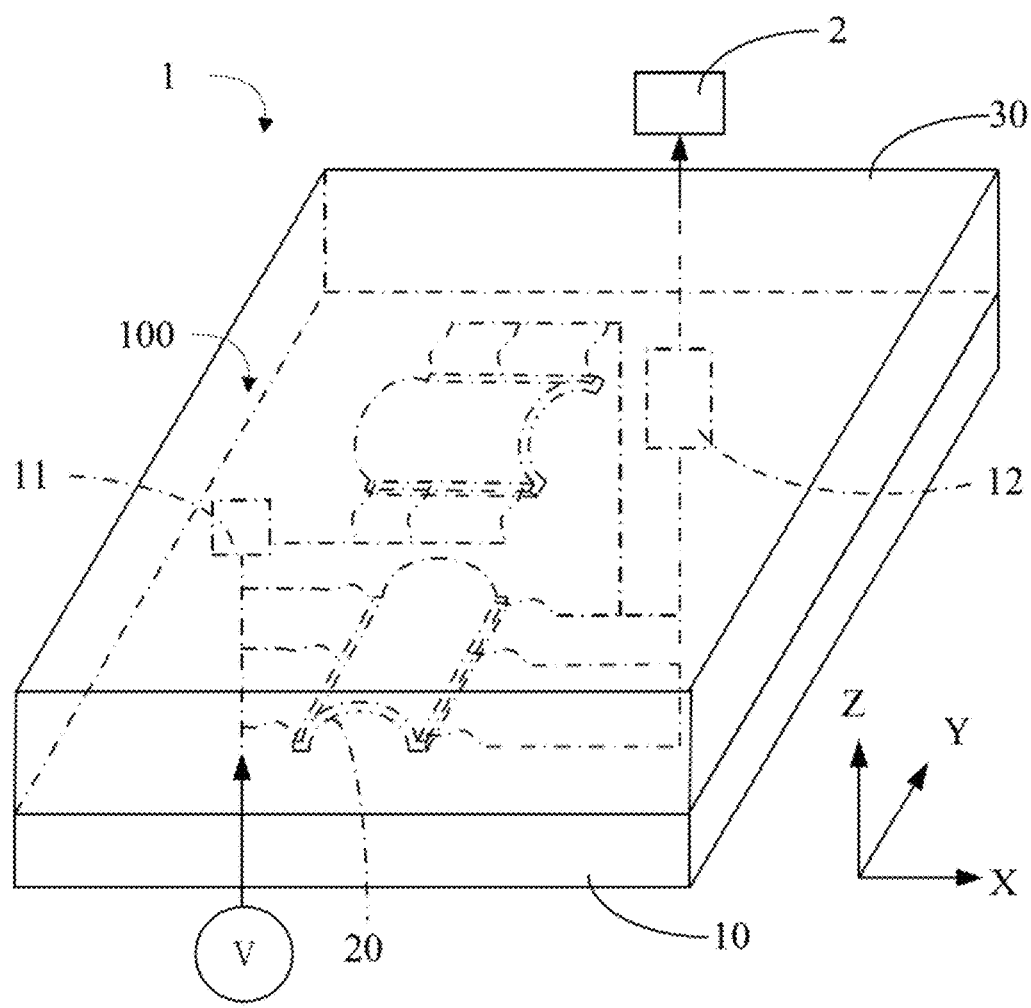
FIG. 1 is a diagrammatic view of an embodiment of a sensor capable of sensing a shear force.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The term "comprising," when utilized, means "including, but not necessarily limited to"; it specifically indicates open-ended inclusion or membership in the so-described combination, group, series and the like.

FIG. 1 illustrates an embodiment of a sensor 1 capable of sensing a shear force and electrically connected to a mobile terminal 2. The mobile terminal 2 can be a tablet computer or a cell phone. The sensor 1 includes a substrate 10 and at least one support 20 located on and secured to the substrate 10. Each support 20 is a three-dimensionally arched structure which can be elastically deformed. In at least one embodiment, the substrate 10 is a printed circuit board (PCB), and more specifically, the substrate 10 can be a flexible printed circuit board (FPC). Each support 20 is made of stainless steel. The sensor 1 further includes a casing 30 located on the substrate 10. The substrate 10 and the casing 30 cooperatively form a receiving space 100 for receiving each support 20. The substrate 10 further includes a vibrator 11 and a processor 12 located on and secured to the substrate 10.

Figure 2:
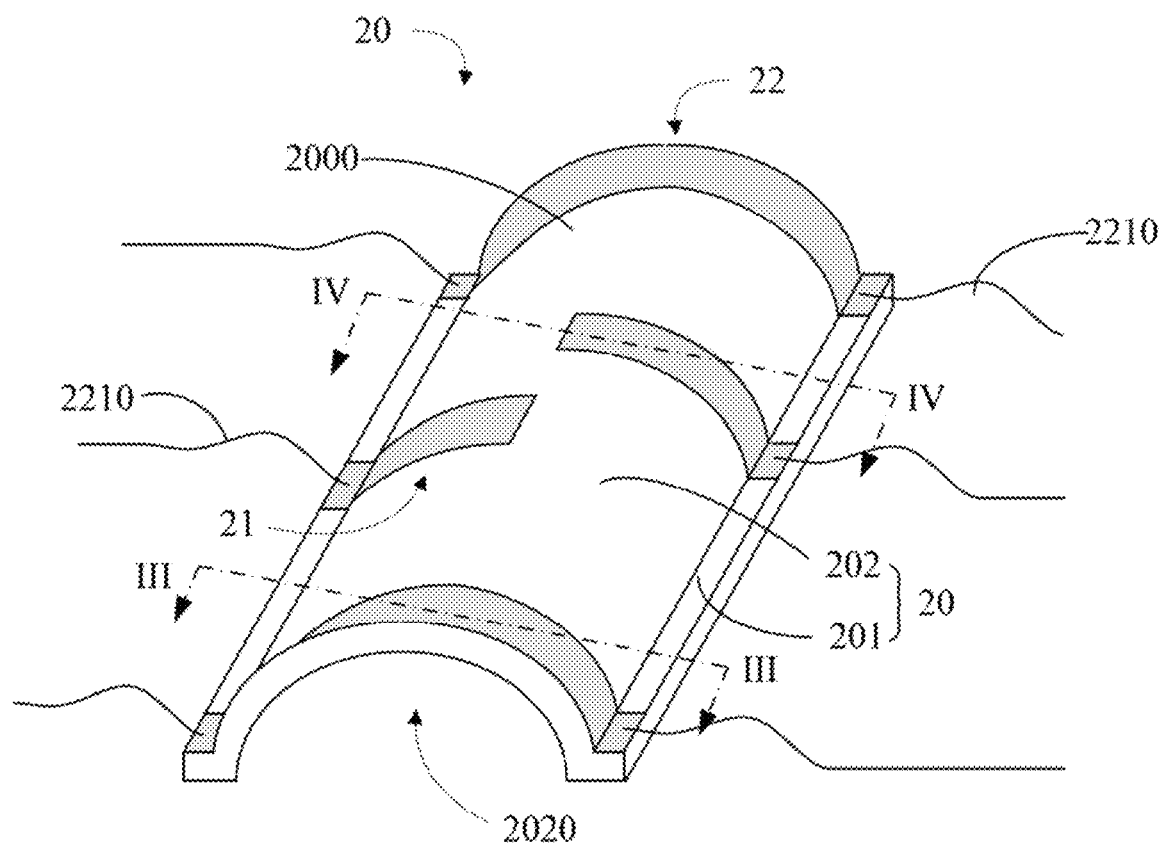
FIG. 2 is an isometric view of a support included in the sensor of FIG. 1.

FIG. 2 illustrates that each support 20 includes two opposite flange portions 201 and an arched portion 202 located between the two flange portions 201. Each support 20 is secured to the substrate 10 via the two flange portions 201. The arched portion 202 is arched away from the substrate 10, thereby forming a space 2020 between the arched portion 202 of each support 20 and the substrate 10.

An exterior surface 2000 of each support 20 facing or positioned away from the substrate 10 includes at least one shear force sensing unit 21. In at least one embodiment, the exterior surface 2000 of each support 20 can further include at least one pressure sensing unit 22. Each of the shear force sensing unit 21 and the pressure sensing unit 22 is connected to wires 2210.

Figure 3:
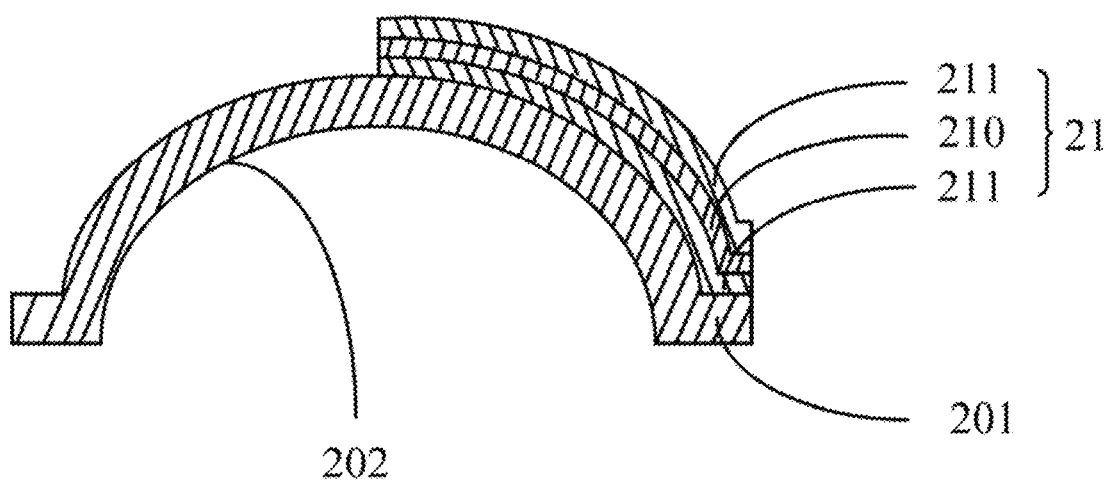
FIG. 3 is cross-sectional view taken along line III-III of FIG. 2.

FIG. 3 illustrates that each shear force sensing unit 21 includes a first piezoelectric film 210 sandwiched between two first electrodes 211. The first piezoelectric film 210 partially covers the support 20, with an upper end being secured to a top point of the arched portion 202 and a lower end being secured to a flange portion 201 of the support 20. As such, each shear force sensing unit 21 is three-dimensionally arched.

Figure 4:
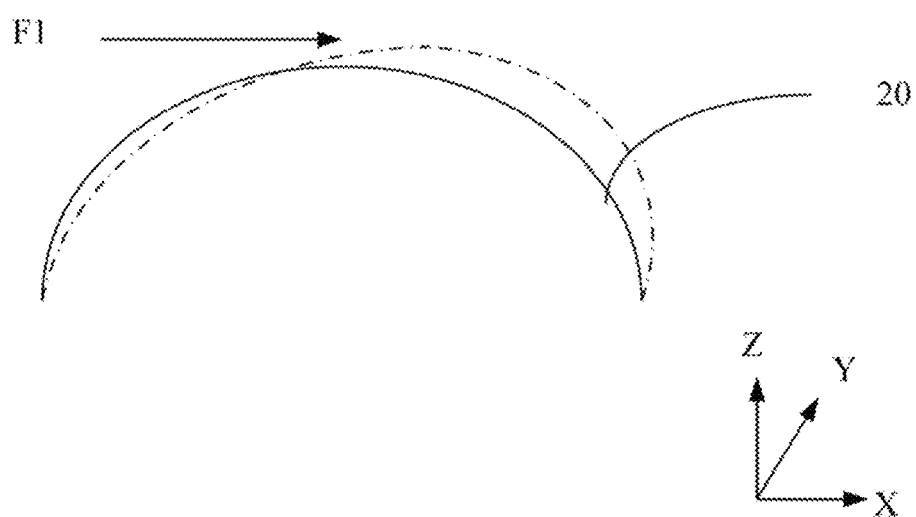
FIG. 4 is a diagrammatic view showing the support of FIG. 2 before and after a shear force F1 is applied.

FIG. 4 illustrates that when a shear force F1 is applied to the support 20, the support 20 is elastically deformed along a direction substantially parallel to the substrate 10 (that is, along −X or +X direction, FIG. 4 showing the support 20 being elastically deformed along +X direction), causing an elastic deformation in the first piezoelectric film 210 of each shear force sensing unit 21. The first piezoelectric film 210 outputs a signal corresponding to a degree of deformation thereof via one of the first electrodes 211. The output signal can be an electrical vibration corresponding to a vibration produced in the first piezoelectric film 210. The output signal can also be a voltage signal.

In at least one embodiment, each support 20 includes two shear force sensing units 21 (shown in FIG. 2). Two top points of the arched portion 202 with a distance between them anchor the upper ends of the first piezoelectric films 210 and two opposing flange portions 201 of the support 20 anchor the lower ends of the first piezoelectric films 210. As such, the first piezoelectric films 210 of the two shear force sensing units 21 can be elastically deformed in opposing directions parallel to the substrate 10 (that is, along −X and +X directions) when shear forces F1 are applied along the two directions.

Figure 5:
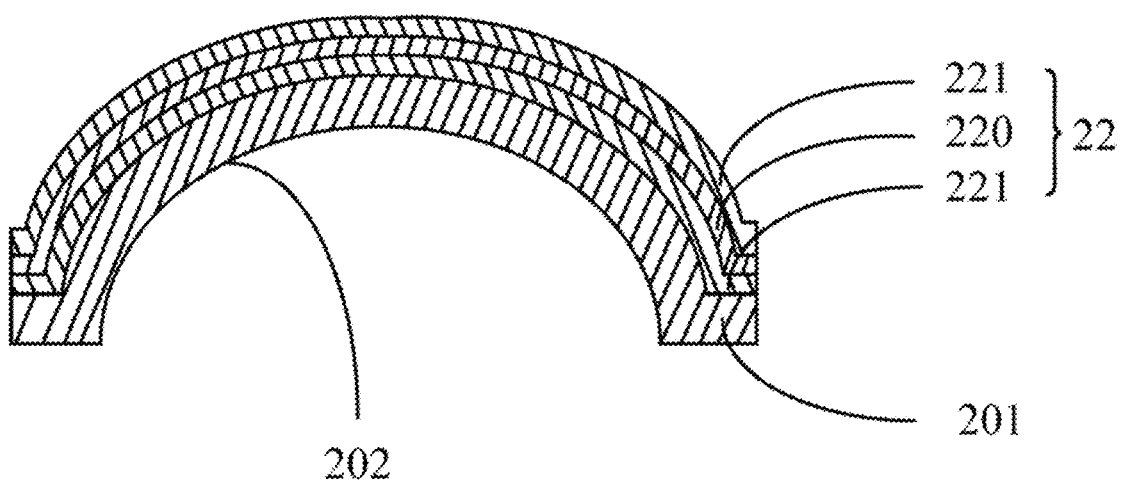
FIG. 5 is cross-sectional view taken along line IV-IV of FIG. 2.

FIG. 5 illustrates that each pressure sensing unit 22 includes a second piezoelectric film 220 sandwiched between two second electrodes 221. The second piezoelectric film 220 partially covers the support 20, with each end being secured to an opposing flange portion 201 of a support 20. As such, each pressure sensing unit 22 is also three-dimensionally arched.

Figure 6:
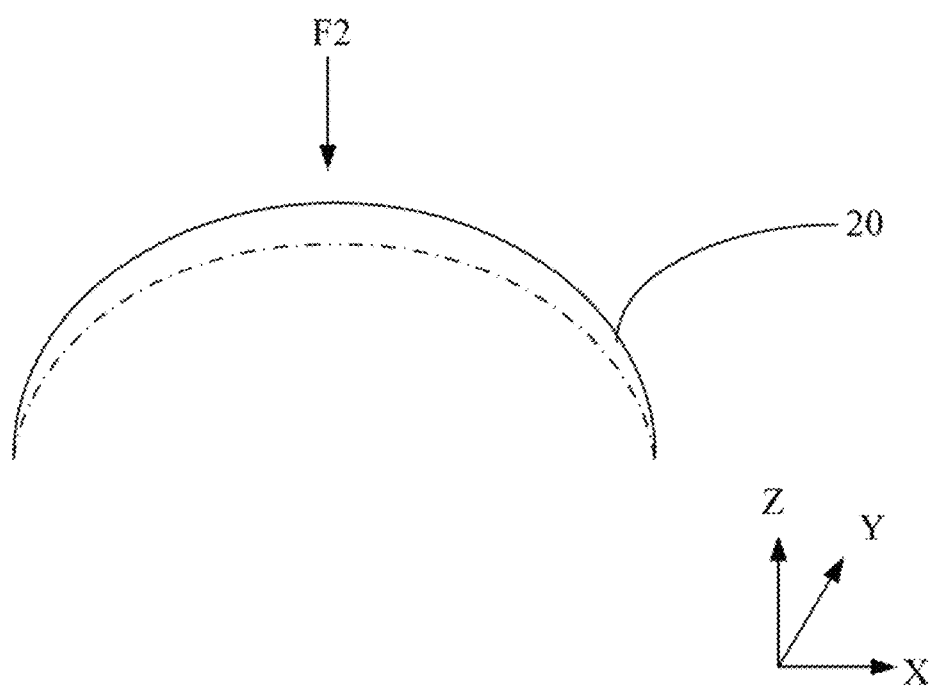
FIG. 6 is a diagrammatic view showing the support of FIG. 2 before and after a pressure F2 is applied.

FIG. 6 illustrates that when a pressure F2 is applied to the support 20, the support 20 is elastically deformed toward the substrate 10 (that is, substantially along −Z direction), causing an elastic deformation in the second piezoelectric film 220 of each pressure sensing unit 22. The second piezoelectric film 220 outputs a signal corresponding to a degree of deformation thereof via one of the second electrodes 221. The output signal can be an electrical vibration corresponding to a vibration produced in the second piezoelectric film 220. The output signal can also be a voltage signal. The output signal can also be a voltage signal. The casing 30 (shown in FIG. 1) is made of elastic material such as rubber or polyformaldehyde, and can effectively transmit a representation of the shear force F1 and the pressure F2 to each shear force sensing unit 21 and each pressure sensing unit 22.

The first piezoelectric film 210 and the piezoelectric film 220 can be made of organic piezoelectric material. The organic piezoelectric material is selected from a group consisting of polytetrafluoroethylene (PTFE), polyvinylidene fluoride (PVDF), polytetrafluoro ethylene (PFA), polychlorotrifluoro ethene (PCTFE), polypropylene (PP), polyethylene (PE), and polyethylene terephthalate (PET). The first piezoelectric film 210 and the second piezoelectric film 220 can also be made of inorganic material such as lead zirconate titanate (PZT). The first electrodes 211 and the second electrodes 221 can be made of a material selected from a group consisting of gold (Au), silver (Ag), platinum (Pt), aluminum (Al), nickel (Ni), copper (Cu), titanium (Ti), and selenium (Se).

In at least one embodiment, the output signal from the shear force sensing unit 21 and the pressure sensing unit 22 is an electrical vibration. In this embodiment, referring to FIG. 1, the vibrator 11 is electrically connected to one end of the first electrode 211 of each shear force sensing unit 21 via the wire 2110, and one end of the second electrode 221 of each pressure sensing unit 22 via the wire 2210. The processor 12 is electrically connected to the opposite end of the first electrode 211 of each shear force sensing unit 21 via a wire 2110, and the opposite end of the second electrode 221 of each pressure sensing unit 22 via a wire 2210. The vibrator 31 outputs a reference electrical vibration with a reference frequency to each shear force sensing unit 21 and each pressure sensing unit 22. If one shear force sensing unit 21 or one pressure sensing unit 22 is elastically deformed, the shear force sensing unit 21 or the pressure sensing unit 22 will change the frequency of the reference electrical vibration. The processor 12 obtains an actual vibration from each shear force sensing unit 21 and each pressure sensing unit 22, and determines whether the actual frequency of the obtained actual electrical vibration equals the reference frequency. If so, the processor 12 determines that no deformation is being experienced by the first piezoelectric film 210 or the second piezoelectric film 220 (that is, that no shear force F1 or pressure F2 is applied to the shear force sensing unit 21 and the pressure sensing unit 22). Otherwise, the processor 12 calculates a difference between the actual frequency and the reference frequency and calculates a value of the shear force F1 or the pressure F2 being applied according to calculated difference. The processor 12 then outputs the calculated value of the shear force F1 or the pressure F2 to the mobile terminal 2.

Figure 7:
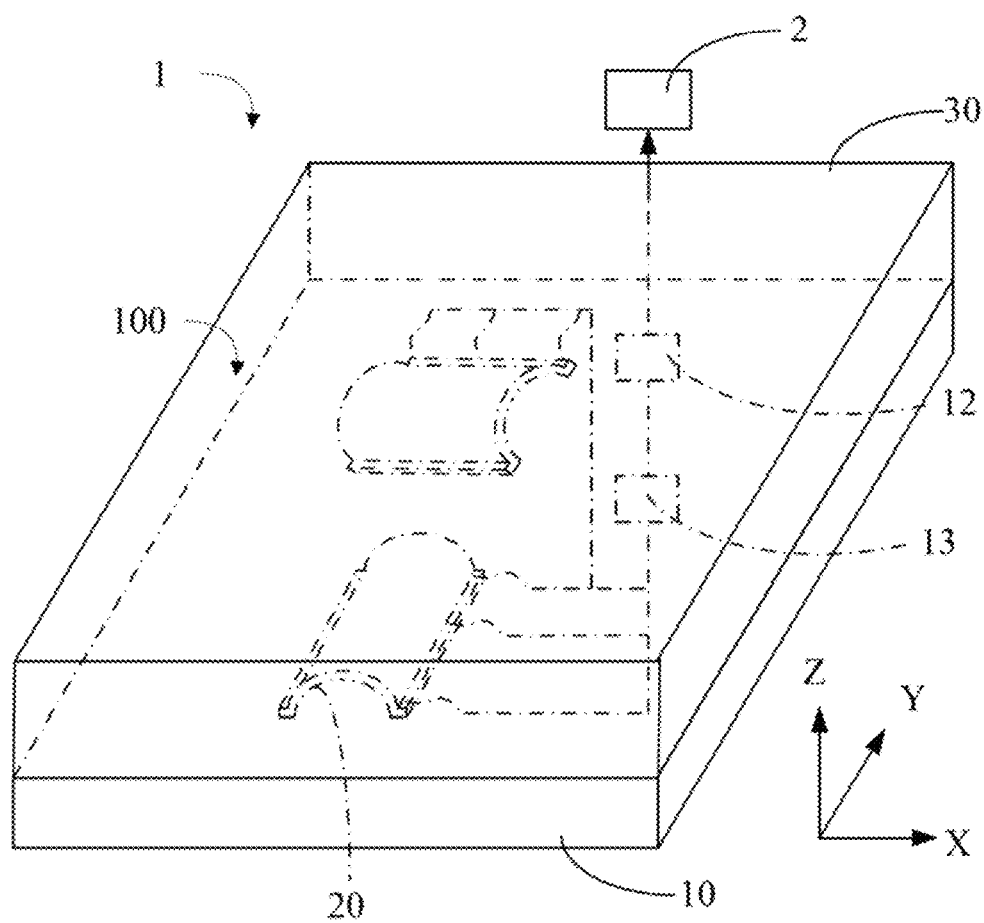
FIG. 7 is similar to FIG. 1, but showing a sensor of another embodiment.

In another embodiment, the output signal from the shear force sensing unit 21 and the pressure sensing unit 22 is a voltage signal. The value of the voltage signal is proportional to the value of the shear force F1 or the pressure F2. In the embodiment illustrated by FIG. 7, the vibrator 11 is omitted. The substrate 10 further includes a signal amplifier 13. The signal amplifier 13 is electrically connected to the first electrode 211 of each shear force sensing unit 21 via a wire 2110, and is electrically connected to the second electrode 221 of each pressure sensing unit 22 via a wire 2210. The signal amplifier 13 obtains the voltage signal from each shear force sensing unit 21 and each pressure sensing unit 22, and amplifies the obtained voltage signal. The processor 12 filters the amplified voltage signal, and calculates the value of the shear force F1 or the pressure F2 being applied according to the voltage signal after filtered. The processor 12 then outputs the calculated value of the shear force F1 or the pressure F2 to the mobile terminal 2.

In at least one embodiment, the sensor 1 includes two supports 20. The flange portions 201 of the two supports 20 are perpendicular to each other (shown in FIG. 1). That is, the first piezoelectric films 210 of the shear force sensing units 21 located on the two supports 20 can be elastically deformed along four different directions substantially parallel to the substrate 10 (that is, along −X, +X, −Y, and +Y directions). Thus, the shear force sensing units 21 located on the two supports 20 can also sense shear forces F1 along the same four different directions.

It is to be understood, even though information and advantages of the present embodiments have been set forth in the foregoing description, together with details of the structures and functions of the present embodiments, the disclosure is illustrative only; changes may be made in detail, especially in matters of shape, size, and arrangement of parts within the principles of the present embodiments to the full extent indicated by the plain meaning of the terms in which the appended claims are expressed.

What is claimed is:

1. A sensor capable of sensing a shear force comprising:
   a substrate;
   at least one support secured to the substrate, each of the at least one support configured to be deformed and three-dimensionally arched away from the substrate; and
   at least one shear force sensing unit located at an exterior surface of each of the at least one support facing away from the substrate, each of the at least one shear force sensing unit including a first piezoelectric film sandwiched between two first electrodes, wherein the first piezoelectric film is configured to partially cover the support so that each of the at least one shear force sensing unit is three-dimensionally arched, whereby when one of the at least one support is deformed, the first piezoelectric film is configured to output a signal corresponding to a degree of deformation thereof via one of the first electrodes.

2. The sensor of claim 1, wherein each of the at least one support comprises two opposite flange portions and an arched portion located between the two flange portions; each of the at least one support is secured to the substrate via the two flange portions; the arched portion is three-dimensionally arched away from the substrate; the first piezoelectric film partially covers the support, with an upper end being secured to a top point of the arched portion and a lower end being secured to one of the two opposite flange portions of the support.

3. The sensor of claim 2, wherein each of the at least one support comprises two shear force sensing units; two top points of the arched portion with a distance between them anchor the upper ends of the first piezoelectric films, and the two opposite flange portions of the support anchor the lower ends of the first piezoelectric films.

4. The sensor of claim 3, comprising two supports, wherein the two opposite flange portions of the two supports are perpendicular to each other, causing the first piezoelectric films of the shear force sensing units covering the two supports to be able to be deformed along four different directions parallel to the substrate.

5. The sensor of claim 2, wherein the output signal from the shear force sensing unit is an electrical vibration corresponding to a vibration produced by a vibration in the first piezoelectric film; the substrate further comprises a vibrator and a processor located on the substrate; the vibrator is electrically connected to one end of the first electrode of each of the at least one shear force sensing unit; the processor is electrically connected to the opposite end of the first electrode of each of the at least one shear force sensing unit; the vibrator is configured to output a reference electrical vibration with a reference frequency to each of the at least one shear force sensing unit; the processor is configured to obtain an actual electrical vibration from each of the at least one shear force sensing unit, and calculate a value of a shear force being applied according to a difference between an actual frequency of the obtained actual electrical vibration and the reference frequency.

6. The sensor of claim 2, wherein the output signal from the shear force sensing unit is a voltage signal; the substrate comprises a signal amplifier and a processor located on the substrate; the signal amplifier is electrically connected to the first electrode of each of the at least one shear force sensing unit, and is configured to obtain the voltage signal from each of the at least one shear force sensing unit and amplifies the obtained voltage signal; the processor is configured to filter the amplified voltage signal, and calculate a value of the shear force being applied according to the voltage signal after filtered.

7. The sensor of claim 2, wherein the first piezoelectric film is made of organic piezoelectric material or inorganic piezoelectric material.

8. The sensor of claim 7, wherein the organic piezoelectric material is selected from a group consisting of polytetrafluoroethylene, polyvinylidene fluoride, polytetrafluoro ethylene, polychlorotrifluoro ethene, polypropylene, polyethylene, and polyethylene terephthalate.

9. The sensor of claim 7, wherein the inorganic material is lead zirconate titanate.

10. The sensor of claim 2, wherein the two first electrodes are made of a material selected from a group consisting of gold, silver, platinum, aluminum, nickel, copper, titanium, and selenium.

11. The sensor of claim 2, further comprising at least one pressure sensing unit, wherein the at least one pressure sensing unit is secured to the exterior surface of each of the at least one support; each of the at least one pressure sensing unit comprises a second piezoelectric film sandwiched between two second electrodes; the second piezoelectric film is configured to partially cover the support, with each end being secured to one of the two opposite flange portions of the support, so that each of the at least one pressure sensing unit is three-dimensionally arched; whereby when one of the at least one support is deformed, the second piezoelectric film is configured to output a signal corresponding to a degree of deformation thereof via one of the second electrodes.

12. The sensor of claim 11, wherein the output signal from the pressure sensing unit is an electrical vibration corresponding to a vibration produced by a vibration in the second piezoelectric film; the substrate further comprises a vibrator and a processor located on the substrate; the vibrator is electrically connected to one end of the second electrode of each of the at least one pressure sensing unit; the processor is electrically connected to the opposite end of the second electrode of each of the at least one pressure sensing unit; the vibrator is configured to output a reference electrical vibration with a reference frequency to each of the at least one pressure sensing unit; the processor is configured to obtain an actual electrical vibration from each of the at least one pressure sensing unit, and calculate a value of a pressure being applied according to a difference between an actual electrical frequency of the obtained actual electrical and the reference frequency.

13. The sensor of claim 11, wherein the output signal from the pressure sensing unit is a voltage signal; the substrate comprises a signal amplifier and a processor located on the substrate; the signal amplifier is electrically connected to the second electrode of each of the at least one pressure sensing unit, and is configured to obtain the voltage signal from each of the at least one pressure sensing unit and amplifies the obtained voltage signal; the processor is configured to filter the amplified voltage signal, and calculate a value of the pressure being applied according to the voltage signal after filtered.

14. The sensor of claim 11, wherein the two second piezoelectric film are made of organic piezoelectric material or inorganic piezoelectric material.

15. The sensor of claim 14, wherein the organic piezoelectric material is selected from a group consisting of polytetrafluoroethylene, polyvinylidene fluoride, polytetrafluoro ethylene, polychlorotrifluoro ethene, polypropylene, polyethylene, and polyethylene terephthalate.

16. The sensor of claim 14, wherein the inorganic material is lead zirconate titanate.

17. The sensor of claim 11, wherein the second electrodes is made of a material selected from a group consisting of gold, silver, platinum, aluminum, nickel, copper, titanium, and selenium.

18. The sensor of claim 11, further comprising a casing, wherein the casing is located on the substrate; the substrate and the casing cooperatively form a receiving space for receiving each of the at least one supports.

19. The sensor of claim 18, wherein the casing is made of rubber or polyformaldehyde.

* * * * *